US009578282B1

(12) United States Patent
Sills et al.

(10) Patent No.: US 9,578,282 B1
(45) Date of Patent: Feb. 21, 2017

(54) TECHNIQUES FOR INITIATING REAL-TIME COMMUNICATION SESSIONS

(71) Applicant: Google Inc., Mountain View, CA (US)

(72) Inventors: Maxwell Andrew Sills, San Francisco, CA (US); Daniel Berlin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 351 days.

(21) Appl. No.: 14/494,063

(22) Filed: Sep. 23, 2014

(51) Int. Cl.
*H04N 7/14* (2006.01)

(52) U.S. Cl.
CPC ..................... *H04N 7/147* (2013.01)

(58) Field of Classification Search
CPC ........................................................ H04N 7/14
USPC ................. 348/14.01, 14.08, 14.11
See application file for complete search history.

(56) References Cited

U.S. PATENT DOCUMENTS

| | | | |
|---|---|---|---|
| 5,297,195 A | 3/1994 | Thorne et al. | |
| 6,212,268 B1* | 4/2001 | Nielsen | H04M 3/42195 370/352 |
| 6,807,423 B1* | 10/2004 | Armstrong | H04L 12/1813 370/328 |
| 7,088,802 B2* | 8/2006 | Light | H04M 3/2272 379/32.01 |
| 7,356,137 B1* | 4/2008 | Burg | H04M 3/42263 379/201.07 |
| 8,201,108 B2 | 6/2012 | Chen et al. | |
| 2006/0066717 A1 | 3/2006 | Miceli | |
| 2010/0246791 A1* | 9/2010 | Wang | H04M 3/42195 379/201.02 |
| 2013/0094642 A1* | 4/2013 | Sverdlov | H04M 3/565 379/201.03 |

FOREIGN PATENT DOCUMENTS

WO 2004084054 A2 9/2004

* cited by examiner

*Primary Examiner* — Olisa Anwah
(74) *Attorney, Agent, or Firm* — Remarck Law Group PLC

(57) ABSTRACT

A technique for initiating a communication session can include receiving a signal that a first and second user desire to participate in a communication session during a particular time period. The technique can include monitoring activity of the first and second users during the particular time period to determine whether the users are prepared to participate in the communication session. When it is determined that the first user is prepared to participate in the communication session, the technique can include outputting, to the second user computing device, an indication that the first user is prepared to participate in the communication session. When it is determined that both of the first and second users are prepared to participate in the communication session, the technique can include initiating the communication session.

20 Claims, 4 Drawing Sheets

TECHNIQUES FOR INITIATING REAL-TIME COMMUNICATION SESSIONS

FIELD

The present disclosure relates to real-time communication sessions and, more particularly, to an improved technique for initiating real-time communication sessions via computing devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing devices are being more and more frequently utilized for electronic communication. For example only, a user may utilize his/her mobile phone or computing device to participate in a communication session. A communication session may feature, e.g., multi-way text-based chat, real-time audio conversations, and/or video conferences, which typically allow a user to communicate with one or more other users in real-time. Such real-time communication may, in certain circumstances, be more desirable than email and other "asynchronous" electronic communication forms that typically involve relatively long delays between users receive and/or respond to messages. For example only, real-time electronic communication may provide a more social interaction between users as it may more closely resemble in-person communication where users see, hear and interact with each other.

Known mechanisms for initiating real-time communication sessions are cumbersome and inefficient. Such mechanisms include a user sending a message, invite, etc. to another user to see if that other user is available to communicate at that time. In the event that the other user is unavailable, the other user may reply at a later time when the original user has become unavailable. Accordingly, users may exchange emails, text messages, voicemails, and/or other communications just to set up a date and time when the users are available for real-time communication. Even when the users agree on a date and time for a communication session, one user is typically late or early, or is no longer available at the scheduled date and time. It would be beneficial to provide an improved technique for initiating communication sessions between users that ameliorates or eliminates one or more of the issues described above.

SUMMARY

In some implementations, a computer-implemented technique for initiating a communication session is disclosed. The technique can include receiving, at a server computing device having one or more processors, a signal that a first user and a second user desire to participate in a communication session during a particular time period via a first user computing device and a second user computing device, respectively. The particular time period can begin at a beginning time and end at an end time. The technique can also include monitoring, at the server computing device, activity of the first user at the first user computing device during the particular time period to determine whether the first user is prepared to participate in the communication session. Further, the technique can include monitoring, at the server computing device, activity of the second user at the second user computing device during the particular time period to determine whether the second user is prepared to participate in the communication session. When the server computing device determines that the first user is prepared to participate in the communication session, the technique can include outputting, from the server computing device and to the second user computing device, an indication that the first user is prepared to participate in the communication session. When the server computing device determines that both of the first and second users are prepared to participate in the communication session, the technique can additionally include initiating, at the server computing device, the communication session.

In some embodiments, the server computing device can determine that each particular user is prepared to participate in the communication session when: (i) the particular user is present at an associated particular user computing device, and (ii) behavior of the particular user indicates an activity level of the particular user below a threshold indicative of the particular user being actively engaged with an entity other than a communication application with which the particular user will interact during the communication session.

Furthermore, in some embodiments monitoring activity of each particular user of the first and second users can comprise receiving, at the server computing device, image data from a particular user computing device associated with the particular user, the image data being obtained at the particular user computing device from a video camera. Alternatively or additionally, monitoring activity of each particular user of the first and second users can comprise receiving, at the server computing device, audio data from a particular user computing device associated with the particular user, the audio data being obtained at the particular user computing device from a microphone. In some examples, monitoring activity of each particular user of the first and second users can comprise receiving, at the server computing device, an activity signal from a particular user computing device associated with the particular user, where the activity signal indicates whether the particular user is prepared to participate in the communication session.

In various embodiments, the server computing device can determine that each particular user of the first and second users is prepared to participate in the communication session when: (i) the particular user is present at an associated particular user computing device, (ii) the particular user is not actively engaged with an application other than a communication application with which the particular user will interact during the communication session, and (iii) behavior of the particular user indicates an activity level of the particular user below a threshold indicative of the particular user being actively engaged with an entity other than the associated particular user computing device.

The indication that the first user is prepared to participate in the communication session can comprise an audio indication and/or a visual indication. The technique can also include outputting, from the server computing device, a start indication to the first and second user computing devices when the server computing device initiates the communication session. The communication session can be a video communication session, or any other communication session.

In some additional or alternative implementations, a computer-implemented technique for initiating a communication session is disclosed. The technique can include receiving, at a server computing device having one or more processors, a signal that a first user and a second user desire to participate in a communication session during a particular time period via a first user computing device and a second user computing device, respectively. The particular time period can begin at a beginning time and end at an end time. The technique can also include monitoring, at the server computing device, activity of the first user at the first user computing device during the particular time period to determine whether the first user is prepared to participate in the communication session. Further, the technique can include monitoring, at the server computing device, activity of the second user at the second user computing device during the particular time period to determine whether the second user is prepared to participate in the communication session. When the server computing device determines that the first user is prepared to participate in the communication session, the technique can include outputting, from the server computing device and to the second user computing device, an indication that the first user is prepared to participate in the communication session. When the server computing device determines that the second user is prepared to participate in the communication session, the technique can include outputting, from the server computing device and to the first user computing device, an indication that the second user is prepared to participate in the communication session.

When the server computing device determines that both of the first and second users are prepared to participate in the communication session, the technique can additionally include outputting, from the server computing device, a prompt to the first and second user computing devices recommending that the video communication session begin. The technique can also include receiving, at the server computing device, a first acceptance signal from the first user computing device that indicates that the first user desires to begin the video communication session, and receiving, at the server computing device, a second acceptance signal from the second user computing device that indicates that the second user desires to begin the video communication session. When the server computing device receives the first and second acceptance signals, the technique can further include initiating, at the server computing device, the communication session.

As mentioned, the server computing device can determine that each particular user of the first and second users is prepared to participate in the video communication session when: (i) the particular user is present at an associated particular user computing device, (ii) the particular user is not actively engaged with an application other than a video communication application with which the particular user will interact during the video communication session, and (iii) behavior of the particular user indicates an activity level of the particular user below a threshold indicative of the particular user being actively engaged with an entity other than the associated particular user computing device.

In further embodiments, a server computing device is disclosed. The computing device can include one or more processors and a non-transitory, computer readable medium storing instructions that, when executed by the one or more processors, cause the computing device to perform operations. The operations can include any one or more of the techniques described above.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As mentioned above, known mechanisms for initiating real-time communication sessions can be cumbersome and inefficient, and often result in one or more users waiting for one or more other users to become available and ready in order to initiate the communication session. Because people these days are extremely busy, and perhaps impatient and easily distracted, real-time communication sessions are becoming less common, resulting in the increased use of asynchronous electronic communication. Such asynchronous electronic communication (messaging, emails, etc.) is sometimes perceived to be less social and more impersonal, as well as less spontaneous and convivial, which may result in a reduced feeling of community between users that are connected socially.

In order to reduce or eliminate the above issues, the present disclosure provides improved techniques for initiating real-time communication sessions between users. The techniques provide for determining that users are available and/or prepared to participate in a communication session. When the users are prepared/available, the users may be prompted to begin a communication session and/or the communication session may be initiated automatically. While these techniques may be particularly appropriate for real-time, video communication sessions, the present disclosure is not so limited and the disclosed techniques can be utilized with any type of communication session.

Figure 1:
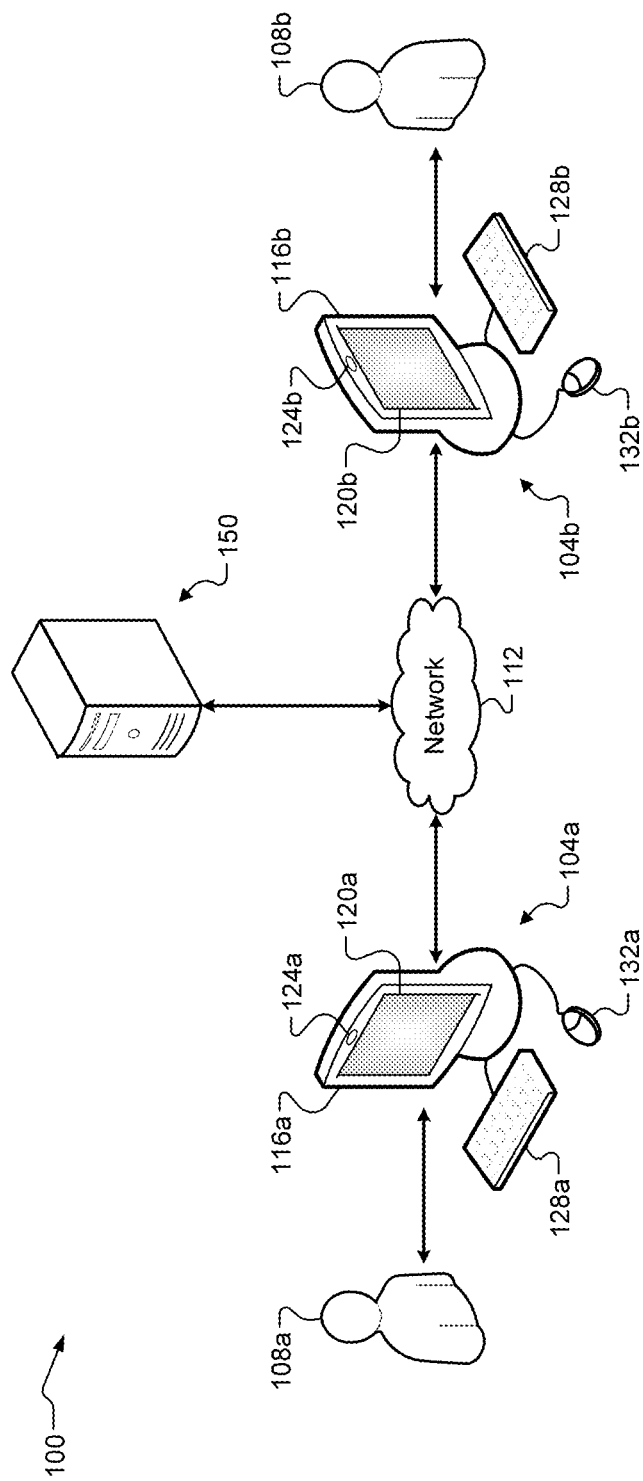
FIG. 1 is a diagram of a computing system including an example server computing device and user computing devices according to some implementations of the present disclosure.

Referring now to FIG. 1, a diagram of an example computing system 100 is illustrated. The computing system 100 can include user computing devices 104*a* and 104*b* (referred to herein individually and collectively as "user computing device(s) 104") that are operated by users 108*a* and 108*b* (referred to herein individually and collectively as "user(s) 108"), respectively. The user computing devices 104 can be configured to communicate with each other via a network 112. Examples of the user computing devices 104 include desktop computers, laptop computers, tablet computers, and mobile phones. While two computing devices 104 are illustrated, it should be appreciated that the computing system 100 can include any number of computing devices 104 that can communicate with each other for a group chat session. The network 112 can include a local area network (LAN), a wide area network (WAN), e.g., the Internet, or a combination thereof.

In some implementations, the user computing devices 104 include peripheral components. The computing devices 104 include displays 116a and 116b (referred to herein individually and collectively as "display(s) 116") having display areas 120a and 120b (referred to herein individually and collectively as "display area(s) 120"), respectively. In some implementations, the displays 116 are touch displays. The computing devices 104 also include video cameras 124a and 124b (collectively "video cameras 124"). The video cameras 124 can each be configured to capture image and video data with respect to its respective computing device 104. For example, the video cameras 124 can be configured to capture image and video data of the users 108. The computing devices 104 can also include other input devices, such as mice 132a and 132b (referred to herein individually and collectively as "mouse/mice 132") and keyboards 128a and 128b (referred to herein individually and collectively as "keyboard(s) 128").

The computing system 100 can further include a server computing device 150 that is configured to communicate with the user computing devices 104 via the network 112. As used herein, the term "server computing device" can refer to any suitable hardware computer server, as well as both a single server and multiple servers operating in a parallel or distributed architecture.

Figure 2:
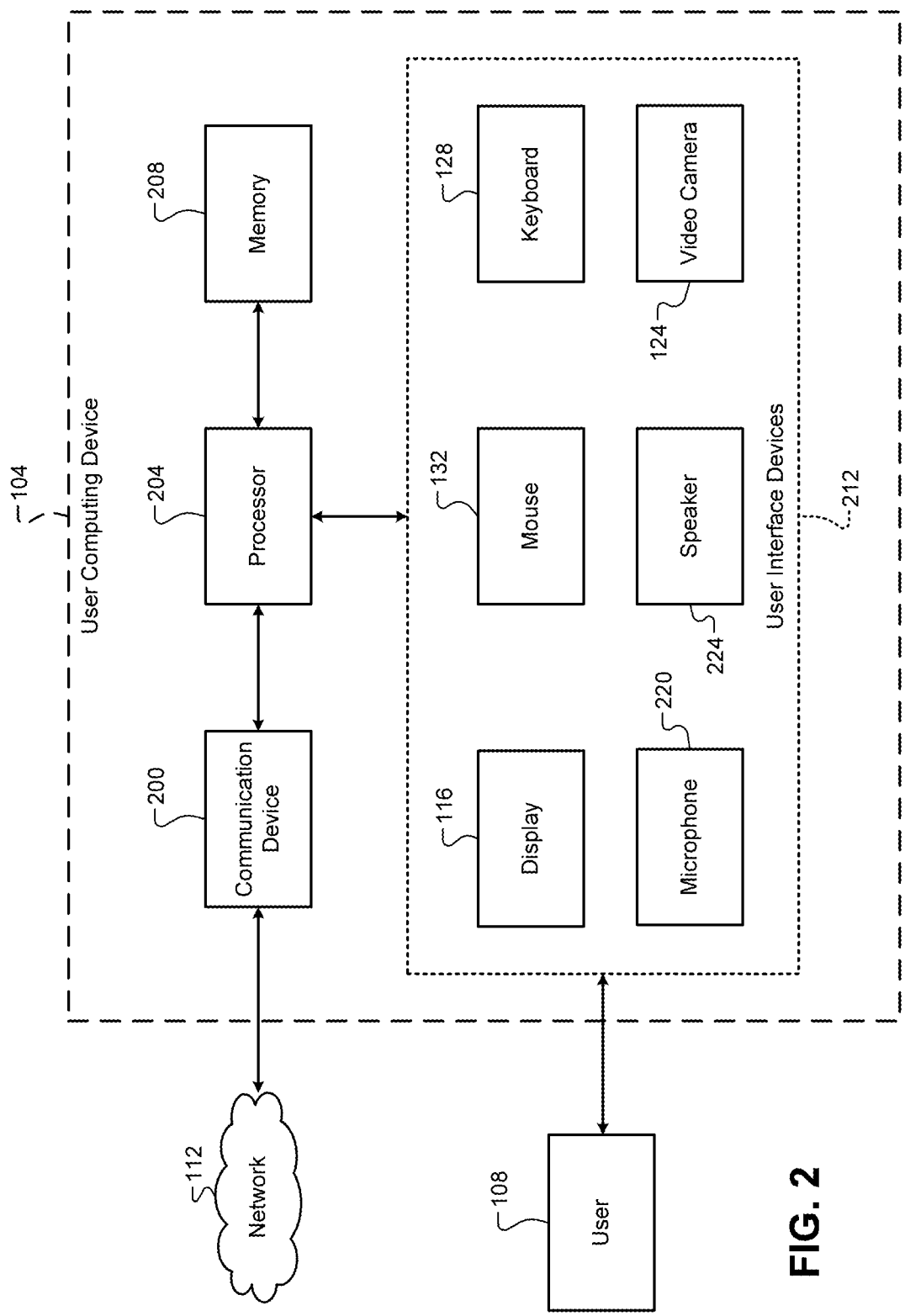
FIG. 2 is a functional block diagram of the example user computing device of FIG. 1.

Referring now to FIG. 2, a functional block diagram of one example computing device 104 is illustrated. While a single computing device 104 and its associated user 108 and example components are described and referred to hereinafter, it should be appreciated that both computing devices 104 can have the same or similar configuration and thus can operate in the same or similar manner. The computing device 104 can include a communication device 200, a processor 204, and a memory 208. The computing device 104 can also include the display 116, the mouse 132, the keyboard 128, and the video camera 124 (referred to herein individually and collectively as "user interface device(s) 212"). The user interface devices 212 are configured for interaction with the user 108. In some implementations, the user interface devices 212 can further include a microphone 220, and a speaker 224.

The communication device 200 is configured for communication between the processor 204 and other devices, e.g., the other computing device 104 and the server computing device 150, via the network 112. The communication device 200 can include any suitable communication components, such as a transceiver. Specifically, the communication device 200 can transmit a request to initiate a chat communication session and can provide a response to this request to the processor 204. The communication device 200 can then handle transmission and receipt of the various communications between the computing devices 200 during the chat session. The memory 208 can be configured to store information at the computing device 104, such as chat settings for the user 108. The memory 208 can be any suitable storage medium (flash, hard disk, etc.).

The processor 204 can be configured to control operation of the computing device 104. It should be appreciated that the term "processor" as used herein can refer to both a single processor and two or more processors operating in a parallel or distributed architecture. The processor 204 can be configured to perform general functions including, but not limited to, loading/executing an operating system of the computing device 104, controlling communication via the communication device 200, and controlling read/write operations at the memory 208. The processor 204 can also be configured to perform specific functions relating to at least a portion of the present disclosure, which are described in greater detail below.

Figure 3:
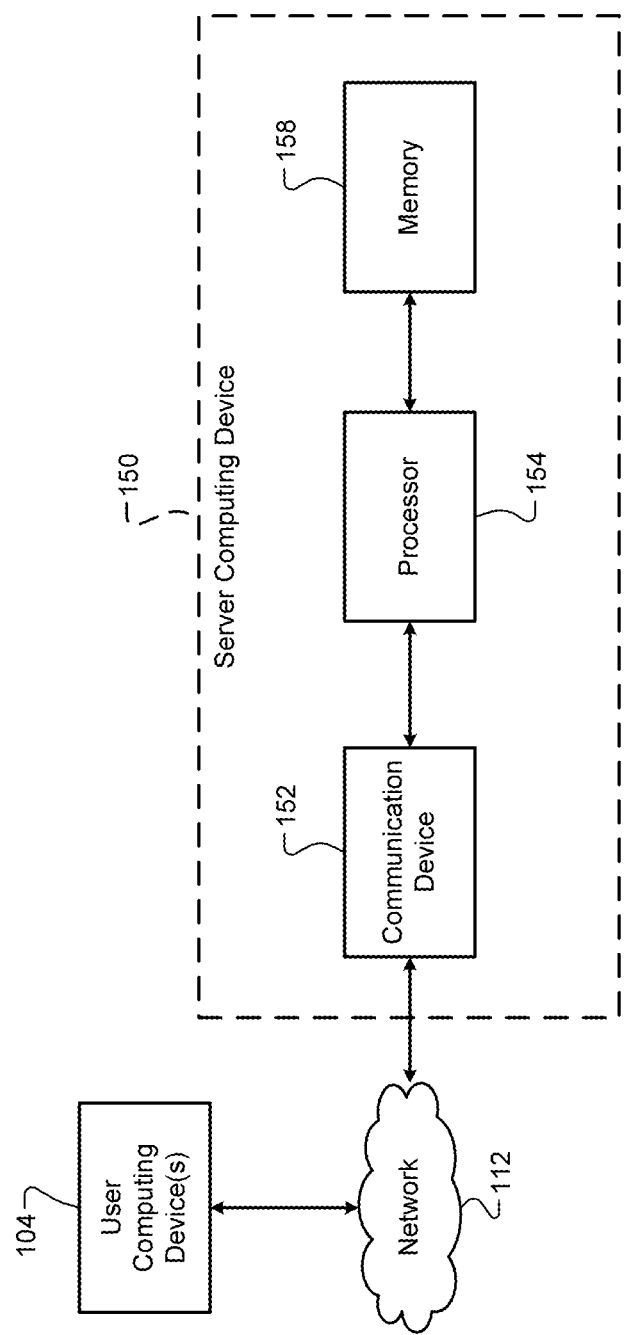
FIG. 3 is a functional block diagram of the example server computing device of FIG. 1.

Referring now to FIG. 3, a functional block diagram of the server computing device 150 is illustrated. It should be appreciated that the server computing device 150 can have the same or similar structure to the user computing devices 104 described above. The server computing device 150 can include a communication device 152, a processor 154, and a memory 158. As described above, the term "processor" as used herein can refer to both a single processor and multiple processors operating in a parallel or distributed architecture. The communication device 152 can include any suitable communication components (e.g., a transceiver) for communication via the network 112. The memory 158 can be any suitable storage medium (flash, hard disk, etc.) for storing information at the server computing device 150. The processor 154 can control operation of the server computing device 150 and can implement at least a portion of the techniques of the present disclosure, which are described in greater detail below.

As briefly mentioned above, the present disclosure relates to techniques for initiating communication sessions. While these techniques will be described in relation to the user computing devices 104 and the server computing device 150, it should be appreciated that more or less computing devices can be used to perform these techniques. Furthermore, it should also be appreciated that, while each feature or element of these techniques may be described as being performed by a specific computing device, such features or elements could instead be performed by another computing device or computing devices, alone or in combination with the specific computing device described.

In example implementations, the server computing device 150 receives a signal that two or more users desire to participate in a communication session via the users' associated computing devices. The signal can be any indication that a first user desires to communicate with a second user (or additional users). For example, the signal may indicate that the first user 108a and the second user 108b desire to participate in a communication session via the first user computing device 104a and the second user computing device 104b, respectively. Examples of such signals include, but are not limited to, emails, text messages, meeting invitations, and voicemails.

In some embodiments, the signal may indicate a particular time period during which the users 108 wish to communicate. The particular time period can be: (1) selected by one or more of the users 108 and explicitly indicated in the signal, (2) determined by the server computing device 150 based on user availability indicated by the signal (an electronic calendar, etc.), or (3) a combination thereof. For example only, the signal may be indicative of the users' typical work hours. The server computing device 150 can determine, based on the known type of social connection between the users (work colleague, personal friend, etc.), if available, whether the users would like to communicate during the users' typical work hours, or outside of work hours. The particular time period may begin at a start time and end at an end time, however, the start and end time may be predefined, undefined, or completely flexible and subject to revision.

Based on the signal, the server computing device 150 can monitor the activities of the users 108 (e.g., the first and second users 108a and 108b) at their associated user computing devices 104 (e.g., the first and second user computing devices 104a and 104b) during the particular time period indicated by the signal. It should be appreciated that the "activities" of a user being monitored can include any information or other data regarding and/or associated with the user, as further described below. The monitoring of such user data is performed in an "opt-in" manner, in which all data is stored locally except where the user gives express consent to share the data. Furthermore, in some examples, the system 100 provides privacy protections for the user data including, but not limited to, anonymization of personally identifiable information, aggregation of data, filtering of sensitive information, encryption, hashing or filtering of sensitive information to remove personal attributes, time limitations on storage of information, and/or limitations on data use or sharing. In this manner, the data can be anonymized and aggregated such that individual user data is not revealed.

The activity of a user 108 can be monitored by the server computing device 150 to determine whether the user 108 is prepared (available, ready, etc.) to participate in a communication session. In some implementations, the server computing device 150 receives raw, unprocessed data from the user computing devices 104, which is then processed and analyzed by the server computing device 150 to determine the activity of a user 108. In other implementations, the server computing device 150 merely receives an activity signal from the user computing devices 104 that indicates that the associated user 108 may be prepared to participate in the communication session. In still further implementations, the server computing device 150 receives a combination of raw, unprocessed data, as well as one or more activity signals/indications that users 108 may be prepared to participate in a communication session. It should be appreciated that other possibilities exist, such as the server computing device 150 receiving partially processed/analyzed user data, separately from or in combination with any other type of data, which are explicitly intended to be within the scope of the present disclosure.

For example only, the server computing device 150 may determine whether a user 108 is prepared to participate in a communication session based on: (1) whether the user 108 is present at his/her associated user computing device 104 (at the same or similar location, within a range of associated locations, etc.), (2) whether the particular user 108 is or is not actively engaged with an application other than a communication application with which the user 108 will interact during the communication session, and/or (3) whether behavior of the particular user 108 indicates an activity level of the particular user 108 below a threshold indicative of the particular user 108 being actively engaged with an entity (a person, a computing device, a book, a board game, a video game, etc.) other than his/her user computing device 104.

With respect to whether the user 108 is present at his/her associated user computing device 104, the server computing device 150 may receive a physical location of the user (e.g., based on a location of the user's mobile phone) that can be compared to a known location of the user computing device 150. This is analogous to receiving raw data. Additionally or alternatively, the server computing device 150 may receive an indication from the user computing device 104 that the user 108 is present at the user computing device 104. This is analogous to receiving an activity signal that indicates such a condition is satisfied without further processing by the server computing device 150. In other words, the server computing device 150 can receive raw (or only partially processed) data from a user computing device 104, and/or an activity signal that indicates that a condition is satisfied based on the user computing device 104 processing the raw data, in order to determine whether a user 108 is prepared to participate in a communication session.

In addition to or independent from the above, monitoring the activity of a user 108 can include receiving application data from a particular user computing device 104 associated with the user 108). For example only, the application data can include an identification of the application(s) with which the user 108 is interacting at the particular user computing device 104, the type of interaction of the user 108, and even the data being output from and/or input to the application(s).

In further examples, monitoring the activity of a user 108 can include receiving image data from a particular user computing device 104 associated with the user 108, and processing such image data to determine the preparedness of the user 108 to participate in a communication session. The image data can, e.g., be obtained from a video camera 124 or other imaging device associated with the user computing device 104.

The image data can be processed to track eye movement, facial behavior, etc. of a user 108 in order to determine where the attention of the user 108 is directed, and/or whether the user 108 is likely to be available/prepared to participate in a communication session. For example only, if the image data indicates that a user 108 is facing a first portion of a display 116 of the user computing device 104 that is currently displaying an email application, and that the user 108 is quickly shifting her/his eyes to a second portion of the display 116 that is displaying a word processing application, it may be determined that the user 108 is actively engaged with and focused on an email/word processing document and is, therefore, not prepared to participate in a communication session. If, however, the image data indicates that the user 108 is looking at a portion of the display 116 associated with a browser application, and is lazily modifying his glance in a manner indicative of relative detachment to the user computing device 104, it may be determined that the user 108 is prepared to participate in a communication session.

Additionally or alternatively, monitoring the activity of a user 108 can include receiving audio data from a particular user computing device 104 associated with the user 108 (e.g., obtained from a microphone 220), and processing such audio data to determine the preparedness of the user 108 to participate in a communication session. For example only, if the audio data indicates that a user 108 is speaking, it may be determined that the user 108 is actively communicating (he or she is on the telephone, speaking with another person, dictating a voice input, etc.) or is otherwise not prepared to participate in a communication session. If, however, the audio data indicates that the user 108 is being relatively silent, or merely humming or clearing her/his throat, it may be determined that the user 108 is prepared to participate in a communication session.

It should be appreciated that the above merely describes non-limiting examples of techniques for monitoring the activities of a user 108, and other techniques can be utilized separately from, or in combination with, these examples.

When it is determined that a user 108 is prepared to participate a communication session, an indication to other user computing device(s) 104 associated with other user(s) 108 that may participate in the communication session can be output. The indication can denote that the user 108 is now prepared to participate in a communication session. The indication can, e.g., include an audio indication (chime, beep, ring, etc.), and/or a visual indication (a flash or other video output at a display 116, a pop-up window, an invitation, a notification beacon, etc.). Upon receiving this indication, the other user(s) 108 can become prepared to join the communication session, which can then be initiated, as described more fully below.

In this manner, a user 108 does not need to wait around, being relatively unproductive, for another user 108 to answer an invitation for a communication session. Instead, each user 108 can continue her/his normal activities during the particular time period, and the system 100 will determine when the users 108 are prepared to participate in the communication session.

When it is determined that the two or more users 108 are prepared to participate in a communication session, the communication session may be initiated, e.g., by the server computing device 150 through the network 112. For example only, a prompt can be sent to the prepared users 108 (or all potentially participating users 108) recommending that the communication session begin. Such a prompt can be, e.g., a pop-up window, an invitation, or other video output at a display 116 of the user computing devices 104. Upon selection of such a prompt by a user 108, an acceptance signal can be sent from his/her associated user computing device 104 to the server computing device 150. When acceptance signals are received from the users 108, the communication session can be initiated. In other examples, the communication session can be automatically initiated when it is determined that the users 108 are prepared to participate in a communication session.

It should be appreciated that, although the above describes the examples where all users 108 have been determined as being prepared before initiating the communication session, the present disclosure contemplates initiating the communication session when a certain number of, but not all, users 108 are prepared to participate. The number of users 108 required to be prepared before initiating the communication session can, e.g., be predefined for the communication session by users 108, or can be selected by the server computing device 150 based on certain criteria.

When a communication session is initiated, a start indication to one or more of the user computing devices 104 associated with the participating users 108 can be output. The start indication can, e.g., include an audio indication (chime, beep, ring, etc.), and/or a visual indication (a flash or other video output at a display 116, a pop-up window, an invitation, a notification beacon, etc.). Further, in some examples, the start indication can be different from the indication that a user 108 is prepared to participate a communication session, as described above. The difference between these two indications can assist users in easily distinguishing between when a user 108 is ready to participate, and when an actual communication session has begun. In some implementations, the start indication can precede the initiation of the communication session and indicate that the communication will be beginning very shortly. Examples of such indications include, but are not limited to, a visual and/or audio countdown (e.g., "3, 2, 1 . . . Start!") that notifies the users 108 of the impending start of the communication session.

Figure 4:
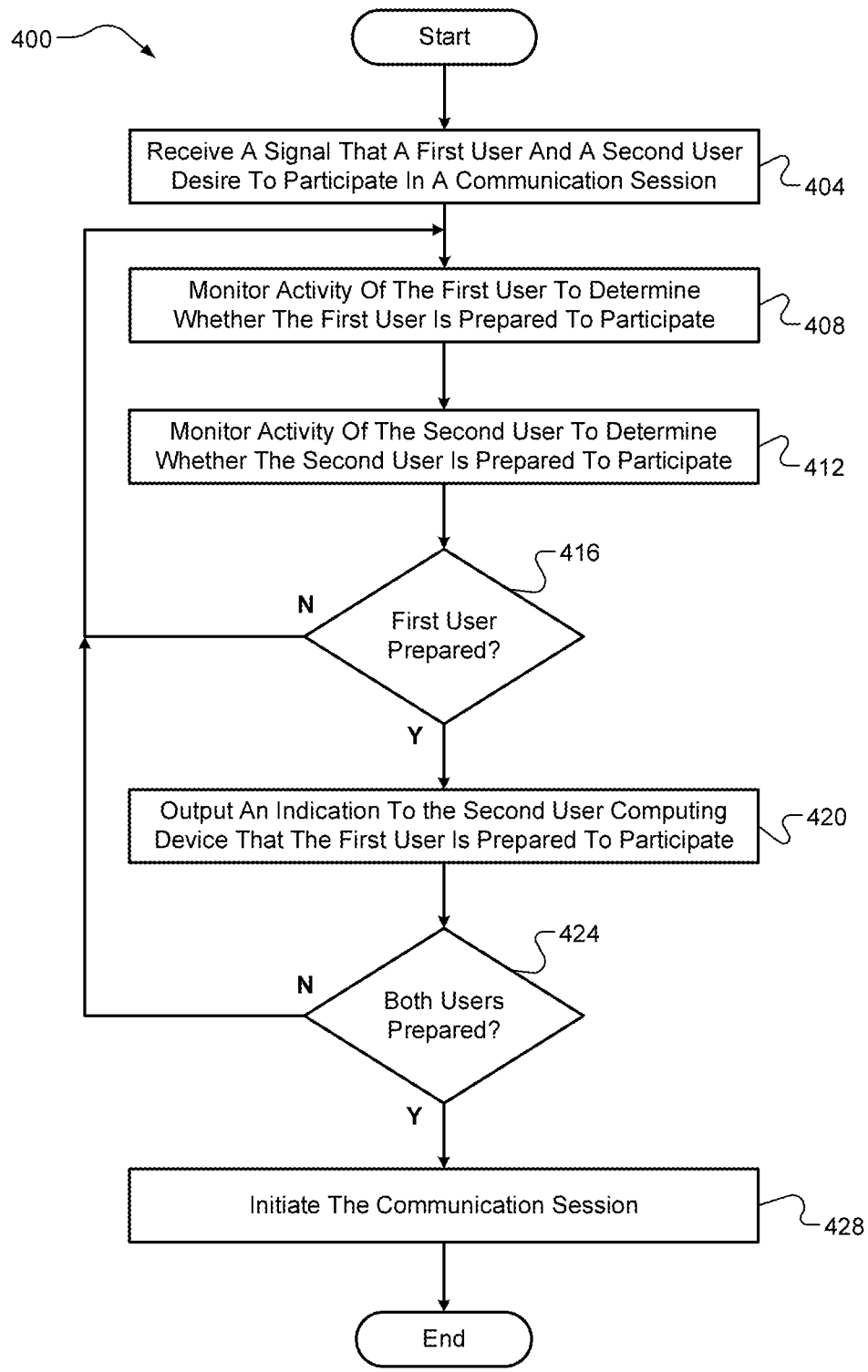
FIG. 4 is a flow diagram of an example technique for initiating a communication session according to some implementations of the present disclosure.

Referring now to FIG. 4, a flow diagram of an example technique 400 for initiating a communication session is illustrated. For ease of description, the technique 400 will be described in reference to being performed by the server computing device 150, but it should be appreciated that the technique 400 can also or alternatively be performed by a user computing device 104, two or more user computing devices 104 operating in a parallel or distributed architecture, and/or any one or more particular components of the server computing device 150 and/or one or a plurality of user computing devices 104.

At 404, the server computing device 150 can receive a signal that a first user 108a and a second user 108b desire to participate in a video communication session during a particular time period. The signal can be received via a first user computing device 104a and a second user computing device 104b associated with the first and second users 108a and 108b, respectively. The particular time period can begin at a beginning time and end at an end time. At 408, the server computing device 150 can monitor activity of the first user 108a at the first user computing device 104a during the particular time period to determine whether the first user 108a is prepared to participate in the video communication session. Similarly, at 412, the server computing device 150 can monitor activity of the second user 108b at the second user computing device 104b during the particular time period to determine whether the second user 108b is prepared to participate in the video communication session.

Based on monitoring the activities described above, the server computing device 150 can determine whether the first user 108a is prepared to participate in the communication session at 416. If the first user 108a is not prepared at 416, the technique 400 returns to 408. If, however, the first user 108a is prepared, the technique 400 proceeds to 420 at which the server computing device 150 can output an indication that the first user 108a is prepared to participate in the video communication session to the second user computing device 104b.

Based on monitoring the activities described above, at 424 the server computing device 150 can determine whether both the first user 108a and the second user 108b are prepared to participate in the communication session. If both of the first and second users 108a and 108b are not prepared at 424, the technique 400 returns to 408. If, however, both of the first user 108a and the second user 108b are prepared, the technique 400 proceeds to 428 at which the server computing device 150 can initiate the communication session. The technique 400 can then end or return to 404 for one or more additional cycles.

In some implementations, the technique 400 can be modified to include outputting a prompt to the first and second user computing devices 104a and 104b when both the first and second users 108a and 108b are determined to be prepared (e.g., at 424). In such implementations, the technique 400 can further include receiving a first acceptance signal from the first user computing device 104a that indicates that the first user 108a desires to begin the communication session, and receiving a second acceptance signal from the second user computing device 104b that indicates that the second user 108a desires to begin the communication session. When the server computing device 150 receives the first and second acceptance signals, the communication session can be initiated (e.g., at 428).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:

receiving, at a server computing device having one or more processors, a signal that a first user and a second user desire to participate in a video communication session during a particular time period via a first user computing device and a second user computing device, respectively, the particular time period beginning at a start time and ending at an end time;

monitoring, at the server computing device, activity of the first user at the first user computing device during the particular time period to determine whether the first user is prepared to participate in the video communication session;

monitoring, at the server computing device, activity of the second user at the second user computing device during the particular time period to determine whether the second user is prepared to participate in the video communication session;

when the server computing device determines that the first user is prepared to participate in the video communication session, outputting, from the server computing device and to the second user computing device, an indication that the first user is prepared to participate in the video communication session;

when the server computing device determines that the second user is prepared to participate in the video communication session, outputting, from the server computing device and to the first user computing device, an indication that the second user is prepared to participate in the video communication session;

when the server computing device determines that both of the first and second users are prepared to participate in the video communication session, outputting, from the server computing device, a prompt to the first and second user computing devices recommending that the video communication session begin;

receiving, at the server computing device, a first acceptance signal from the first user computing device that indicates that the first user desires to begin the video communication session;

receiving, at the server computing device, a second acceptance signal from the second user computing device that indicates that the second user desires to begin the video communication session; and when the server computing device receives the first and second acceptance signals, initiating, at the server computing device, the video communication session, wherein the server computing device determines that each particular user of the first and second users is prepared to participate in the video communication session when: (i) the particular user is present at an associated particular user computing device, (ii) the particular user is not actively engaged with an application other than a video communication application with which the particular user will interact during the video communication session, and (iii) behavior of the particular user indicates an activity level of the particular user below a threshold indicative of the particular user being actively engaged with an entity other than the associated particular user computing device.

2. A computer-implemented method, comprising:

receiving, at a server computing device having one or more processors, a signal that a first user and a second user desire to participate in a communication session during a particular time period via a first user computing device and a second user computing device, respectively, the particular time period beginning at a beginning time and ending at an end time;

monitoring, at the server computing device, activity of the first user at the first user computing device during the particular time period to determine whether the first user is prepared to participate in the communication session;

monitoring, at the server computing device, activity of the second user at the second user computing device during the particular time period to determine whether the second user is prepared to participate in the communication session;

when the server computing device determines that the first user is prepared to participate in the communication session, outputting, from the server computing device and to the second user computing device, an indication that the first user is prepared to participate in the communication session; and when the server computing device determines that both of the first and second users are prepared to participate in the communication session, initiating, at the server computing device, the communication session.

3. The computer-implemented method of claim 2, wherein the server computing device determines that each particular user is prepared to participate in the communication session when: (i) the particular user is present at an associated particular user computing device, and (ii) behavior of the particular user indicates an activity level of the particular user below a threshold indicative of the particular user being actively engaged with an entity other than a communication application with which the particular user will interact during the communication session.

4. The computer-implemented method of claim 2, wherein monitoring activity of each particular user of the first and second users comprises receiving, at the server computing device, image data from a particular user computing device associated with the particular user, the image data being obtained at the particular user computing device from a video camera.

5. The computer-implemented method of claim 2, wherein monitoring activity of each particular user of the first and second users comprises receiving, at the server computing device, audio data from a particular user computing device associated with the particular user, the audio data being obtained at the particular user computing device from a microphone.

6. The computer-implemented method of claim 2, wherein monitoring activity of each particular user of the first and second users comprises receiving, at the server computing device, an activity signal from a particular user computing device associated with the particular user, the activity signal indicating whether the particular user is prepared to participate in the communication session.

7. The computer-implemented method of claim 2, wherein the server computing device determines that each particular user of the first and second users is prepared to participate in the communication session when: (i) the particular user is present at an associated particular user computing device, (ii) the particular user is not actively engaged with an application other than a communication application with which the particular user will interact during the communication session, and (iii) behavior of the particular user indicates an activity level of the particular user below a threshold indicative of the particular user being actively engaged with an entity other than the associated particular user computing device.

8. The computer-implemented method of claim 2, wherein the indication that the first user is prepared to participate in the communication session comprises an audio indication.

9. The computer-implemented method of claim 2, further comprising outputting, from the server computing device, a start indication to the first and second user computing devices when the server computing device initiates the communication session.

10. The computer-implemented method of claim 2, wherein the communication session is a video communication session.

11. The computer-implemented method of claim 10, wherein the indication that the first user is prepared to participate in the communication session comprises a visual indication.

12. A server computing device, comprising:
one or more processors; and
a non-transitory, computer readable medium storing instructions that, when executed by the one or more processors, cause the computing device to perform operations comprising:
receiving a signal that a first user and a second user desire to participate in a communication session during a particular time period via a first user computing device and a second user computing device, respectively, the particular time period beginning at a beginning time and ending at an end time;
monitoring activity of the first user at the first user computing device during the particular time period to determine whether the first user is prepared to participate in the communication session;
monitoring activity of the second user at the second user computing device during the particular time period to determine whether the second user is prepared to participate in the communication session;
when the server computing device determines that the first user is prepared to participate in the communication session, outputting, to the second user computing device, an indication that the first user is prepared to participate in the communication session; and
when the server computing device determines that both of the first and second users are prepared to participate in the communication session, initiating the communication session.

13. The server computing device of claim 12, wherein the server computing device determines that each particular user is prepared to participate in the communication session when: (i) the particular user is present at an associated particular user computing device, and (ii) behavior of the particular user indicates an activity level of the particular user below a threshold indicative of the particular user being actively engaged with an entity other than a communication application with which the particular user will interact during the communication session.

14. The server computing device of claim 12, wherein monitoring activity of each particular user of the first and second users comprises receiving image data from a particular user computing device associated with the particular user, the image data being obtained at the particular user computing device from a video camera.

15. The computer-implemented method of claim 2, wherein monitoring activity of each particular user of the first and second users comprises receiving audio data from a particular user computing device associated with the particular user, the audio data being obtained at the particular user computing device from a microphone.

16. The server computing device of claim 12, wherein monitoring activity of each particular user of the first and second users comprises receiving an activity signal from a particular user computing device associated with the particular user, the activity signal indicating whether the particular user is prepared to participate in the communication session.

17. The server computing device of claim 12, wherein the server computing device determines that each particular user of the first and second users is prepared to participate in the communication session when: (i) the particular user is present at an associated particular user computing device, (ii) the particular user is not actively engaged with an application other than a communication application with which the particular user will interact during the communication session, and (iii) behavior of the particular user indicates an activity level of the particular user below a threshold indicative of the particular user being actively engaged with an entity other than the associated particular user computing device.

18. The server computing device of claim 12, wherein the indication that the first user is prepared to participate in the communication session comprises an audio indication.

19. The server computing device of claim 12, wherein the operations further comprise outputting a start indication to the first and second user computing devices when the server computing device initiates the communication session.

20. The server computing device of claim 12, wherein the communication session is a video communication session.

* * * * *